No. 691,826. Patented Jan. 28, 1902.
B. C. TRUDELLE.
WINTER VELOCIPEDE.
(Application filed June 21, 1901.)
(No Model.)
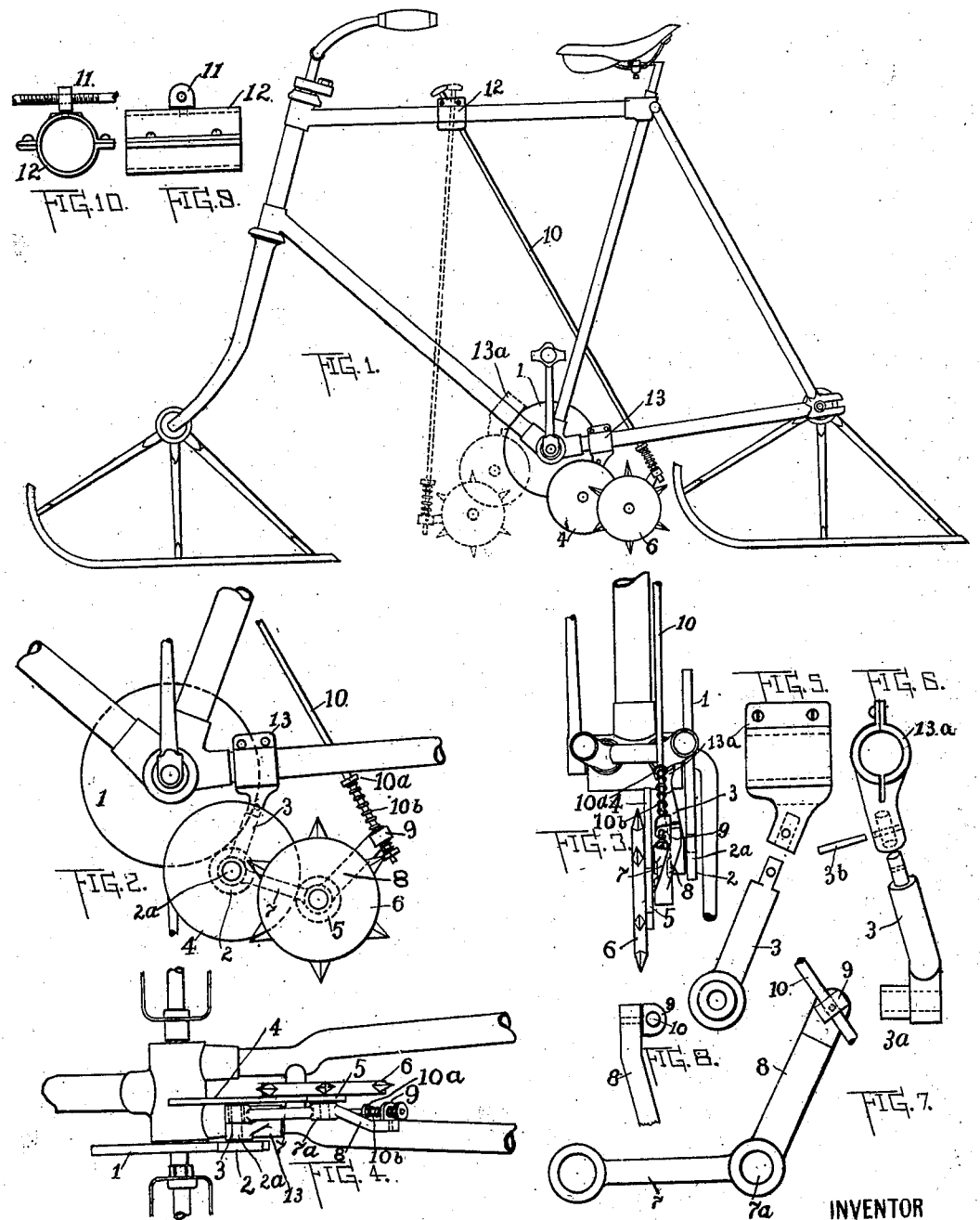
WITNESSES:
Jas. C. Hanson.
W. Stephens.
INVENTOR
B. C. Trudelle
BY
Geo. B. Willcox, ATTORNEY
THE NORRIS PETERS CO., PHOTO-LITHO., WASHINGTON, D. C.

UNITED STATES PATENT OFFICE.

BENJAMIN C. TRUDELLE, OF BAY CITY, MICHIGAN.

WINTER-VELOCIPEDE.

SPECIFICATION forming part of Letters Patent No. 691,826, dated January 28, 1902.

Application filed June 21, 1901. Serial No. 65,417. (No model.)

*To all whom it may concern:*

Be it known that I, BENJAMIN C. TRUDELLE, a citizen of the United States, residing at Bay City, in the county of Bay and State of Michigan, have invented certain new and useful Improvements in Winter-Velocipedes; and I do hereby declare the following to be a full, clear, and exact description of the invention, such as will enable others skilled in the art to which it appertains to make and use the same.

This invention is a winter bicycle or velocipede; and the improvements consist in certain constructions and arrangements of the gearing whereby the position of the driving mechanism is rendered interchangeable and can be easily and quickly attached to or detached from the frame of an ordinary bicycle or applied to a frame especially constructed for the purpose.

The objects of the invention are to provide a simple mechanism having a vertically-yielding toothed driving-wheel that can be adjusted to various positions between the runners to suit various conditions of road-surface and to adapt the bicycle for hill-climbing.

With these and certain other objects in view, which will appear further in this specification, the invention consists in the devices illustrated in the accompanying drawings, in which—

Figure 1 is a side view of a complete bicycle. Fig. 2 is a side view of the driving mechanism. Fig. 3 is an end elevation of the driving mechanism. Fig. 4 is a view of the driving mechanism seen from below. Fig. 5 is a side elevation of the gear-supporting bracket. Fig. 6 is a rear view of the same. Fig. 7 is a side view of the arm carrying the driving-wheel. Fig. 8 is a detail of the swiveled bearing carrying the adjusting-rod. Fig. 9 is a top view of the bracket for carrying the upper end of the adjusting-rod. Fig. 10 is an end view of the same.

As is clearly shown in the drawings, the driving-gear consists in a main spur-gear 1, fixed to the crank-axle of the bicycle, a pinion 2 meshing therewith and having a shaft $2^a$ rigidly fixed thereto, said shaft being rotatably mounted in a bearing carried by the lower end of an arm 3, secured to the bicycle-frame. The opposite end of the shaft $2^a$ carries a gear 4, which meshes with a pinion 5, rigidly attached to the spiked driving-wheel 6. Rotating the gear 1 revolves the driving-wheel in the direction in which the bicycle is to move.

In order to adjust the height of the driving-wheel 6 and to enable it to yield vertically when overriding obstructions in an uneven load, I mount the wheel 6 in the following manner: An arm 7 is pivotally mounted at one end on a bearing $3^a$, carried by the lower end of the arm 3. A bearing $7^a$ at the other end of the arm 7 carries the shaft of the pinion 5, which is thus held in mesh with the gear 4 by means of the arm 7. An upwardly-extending arm 8, fixed to the arm 7, carries at its end a swiveled bearing 9, through which passes an upwardly-extending adjusting-rod 10. The upper end of the adjusting-rod is threaded and is screwed into a swiveled nut 11, carried by a bracket 12, clamped to the upper member of the bicycle-frame. A collar $10^a$, secured to the lower part of the rod 10, resists the thrust of a compressible spring $10^b$, which resists the upward thrust of the swiveled bearing 9, thus permitting the wheel 6 to override obstructions. In order to be effective for hill-climbing purposes, the best position for the driving-wheel is that shown in full lines in Figs. 1 and 2; but, if desired, the driving-wheel can be changed to the position shown in Fig. 1 to suit the convenience of the rider. To make the gears interchangeable, I provide a clamp-bracket 13 on the rear fork of the bicycle-frame and a similar clamp $13^a$ (shown in Figs. 5 and 6) on the front member of the frame. The lower end of this bracket is provided with a socket, into which the upper end of the arm 3 fits and in which it is removably secured by means of a pin $3^b$ or in any other suitable manner. To change the gears into the position shown by dotted lines in Fig. 1, it is only necessary to remove the arm 3 from the socket of the bracket 13 and to secure it in the socket of the bracket $13^a$, reversing the position of the arm 7 and bringing the adjusting-rod 10 into the position shown in dotted lines. The swiveled nut 11 permits the necessary movement of the rod 10.

While I have shown and described the device as applied to the frame of an ordinary bicycle, it may equally well be adapted for use with any other form of frame by suitably varying the size and shape of the supporting-arm 3 and of the clamp which supports it.

What I claim as my invention, and desire to secure by Letters Patent, is—

In a velocipede the combination with a gear-wheel rigidly mounted on the crank-shaft; of a pair of sockets secured to the frame, one in front and one in the rear of the crank-hanger; a bracket removably secured to either of said sockets interchangeably; a vertically-movable arm pivoted to the lower end of said bracket; a train of gears carried by said bracket and arm, the first gear of said train being mounted at the pivotal junction of the bracket and arm, and meshing with the crank-shaft wheel, and the last gear of said train being mounted at the outer end of the arm and operating a spiked driving-wheel; an upwardly-extending adjusting-rod yieldingly fixed at its lower end to the end of said vertically-movable arm, and secured at its upper end to the velocipede-frame, substantially as described and for the purposes set forth.

In testimony whereof I affix my signature in presence of two witnesses.

BENJAMIN C. TRUDELLE.

Witnesses:
 I. GOULD,
 WILLIAM STEPHENS.